United States Patent
Chen

(10) Patent No.: US 12,191,624 B2
(45) Date of Patent: Jan. 7, 2025

(54) COOLING SYSTEM FOR LASER

(71) Applicant: Asteroid Trading Limited, Wan Chai (HK)

(72) Inventor: Alexander Yebo Chen, Wan Chai (HK)

(73) Assignee: Asteroid Trading Limited, Wan Chai (HK)

( * ) Notice: Subject to any disclaimer, the term of this patent is extended or adjusted under 35 U.S.C. 154(b) by 427 days.

(21) Appl. No.: 17/829,834

(22) Filed: Jun. 1, 2022

(65) Prior Publication Data

US 2023/0327389 A1    Oct. 12, 2023

(30) Foreign Application Priority Data

Apr. 6, 2022  (CN) .......................... 202220780018.8

(51) Int. Cl.
*H01S 3/04*   (2006.01)

(52) U.S. Cl.
CPC .......... *H01S 3/0407* (2013.01); *H01S 3/0404* (2013.01)

(58) Field of Classification Search
CPC ... H01S 5/02423; H01S 3/0404; H01S 3/0407
See application file for complete search history.

(56) References Cited

U.S. PATENT DOCUMENTS

| | | | | |
|---|---|---|---|---|
| 3,634,778 A | * | 1/1972 | Melikian | H01S 3/0979 372/34 |
| 2002/0018497 A1 | * | 2/2002 | Naito | A61F 9/00821 372/34 |
| 2014/0269797 A1 | * | 9/2014 | Bishop | F25B 25/005 361/691 |
| 2014/0348189 A1 | * | 11/2014 | Nowak | H01S 3/0064 372/25 |
| 2016/0365701 A1 | * | 12/2016 | Takigawa | H01S 5/0239 |
| 2020/0259306 A1 | * | 8/2020 | Mihara | H01S 3/0405 |

FOREIGN PATENT DOCUMENTS

| | | | | |
|---|---|---|---|---|
| CN | 108988109 A | * | 12/2018 | .......... H01S 3/0407 |
| CN | 111009818 A | * | 4/2020 | .......... H01S 3/0404 |
| CN | 113300194 A | * | 8/2021 | .......... H01S 3/0407 |
| CN | 114122872 A | * | 3/2022 | |
| CN | 114122873 A | * | 3/2022 | |
| FR | 2088187 A1 | * | 1/1972 | |
| KR | 101043156 B1 | * | 12/2008 | |
| KR | 20160110734 A | * | 9/2016 | |
| KR | 20200098827 A | * | 8/2020 | |

* cited by examiner

*Primary Examiner* — Joshua King
(74) *Attorney, Agent, or Firm* — Christensen O'Connor Johnson Kindness PLLC

(57) ABSTRACT

A cooling system for a laser includes: a laser, a housing of the laser having a water inlet and a water outlet; an air cooling mechanism including a first pipeline, an air cooling module, a cooling liquid tank, and a water pump; wherein the air cooling module, the cooling liquid tank, and the water pump are sequentially connected through the first pipeline, both ends of the first pipeline is connected to the water inlet and the water outlet, respectively; the water pump is closer to the water inlet; a water cooling mechanism including a second pipeline and a water chiller in communication with the second pipeline, both ends of the second pipeline being connected to the water inlet and the water outlet, respectively; and a solenoid valve with one inlet and two outlets arranged at a junction of the water outlet, the first pipeline, and the second pipeline.

10 Claims, 3 Drawing Sheets

COOLING SYSTEM FOR LASER

CROSS-REFERENCE TO RELATED APPLICATION

This application claims to the priority of Chinese Patent Application No. 2022207800188, filed on Apr. 6, 2022, the entire content of which is incorporated herein by reference.

TECHNICAL FIELD

The present disclosure relates to the technical field of laser equipment, in particular, relates to a cooling system for a laser.

BACKGROUND

The laser light emitted by the laser is widely used in various fields due to its strong directionality, energy concentration, and high brightness. Usually, when the laser is operating, only a small part of the inputted electric energy is converted into the laser light to be outputted, and most of the inputted electric energy is converted into the heat energy. If the heat is not transferred in time, the internal temperature of the laser will be too high, which will seriously affect the outputted light performance and the service life of the laser.

At present, the laser usually adopts the method of air cooling or water cooling to remove the heat generated during its operation. When the air cooling method is adopted to remove heat, if it is used for a medium and high-power laser, or a laser operating in harsh environments such as high temperatures, the laser will generate a lot of heat during operation. Due to the limited heat dissipation effect of the air cooling method, the heat generated by the laser during operation cannot be removed timely, resulting in that the temperature of the laser cannot be controlled to be in an optimal range, which will seriously affect the outputted light performance and the service life of the laser. When the laser adopts the water cooling method to remove heat, although the cooling effect is good, there is a problem of high energy consumption, especially for a low-power laser, the problem of high energy consumption is particularly obvious.

SUMMARY

According to various embodiments of the present disclosure, a cooling system for a laser is provided.

A cooling system for a laser includes:
- a laser, provided with a housing having a water inlet and a water outlet;
- an air cooling mechanism including a first pipeline, an air cooling module, a cooling liquid tank, and a water pump; the air cooling module, the cooling liquid tank, and the water pump being sequentially connected through the first pipeline; both ends of the first pipeline being connected to the water inlet and the water outlet, respectively; the water pump being closer to the water inlet;
- a water cooling mechanism including a second pipeline and a water chiller in communication with the second pipeline; both ends of the second pipeline being connected to the water inlet and the water outlet, respectively; and
- a solenoid valve with one inlet and two outlets arranged at a junction of the water outlet, the first pipeline, and the second pipeline.

In the above cooling system for the laser, the housing of the laser is provided with the water inlet and the water outlet for the cooling liquid to flow in the laser. When the laser generates less heat during operation, the air cooling mechanism is activated, and the solenoid valve with one inlet and two outlets selectively provide a communication between the laser and the first pipeline. After absorbing the heat generated by the laser during operation, the cooling liquid flows to the first pipeline through the water outlet. When the cooling liquid flows through the air cooling module, the air blown by the air cooling module takes away the heat absorbed by the cooling liquid in time, and then the cooling liquid flows back into the cooling liquid tank. The air-cooled cooling liquid stored in the cooling liquid tank is pumped by the water pump, and then flows into the laser through the water inlet again, so that the cooling liquid can be circulated and reused, and the laser can be cooled down under the premise of low energy consumption. When the laser generates a lot of heat during operation, the water cooling mechanism is activated, and the solenoid valve with one inlet and two outlets selectively provides a communication between the laser and the second pipeline. After absorbing the heat generated by the laser during operation, the cooling liquid flows to the second pipeline through the water outlet, and is cooled down in the water chiller, and then, the water-cooled cooling liquid flows into the laser through the water inlet again, so that the cooling liquid can be circulated and reused, and the laser can be cooled down under the premise of ensuring the reliability of cooling. The cooling system for the laser according to the present disclosure can be flexibly switched to be connected to the air cooling mechanism or the water cooling mechanism based on the amount of heat generated by the laser during operation, which can timely remove the heat generated by the laser during operation, control the temperature of the laser to be in an optimal range, ensuring the cooling reliability of the laser, and can reduce energy consumption.

In one of the embodiments, a three-way connector is further included. The three-way connector is arranged at a junction of the water inlet, the first pipeline, and the second pipeline.

In one of the embodiments, the air cooling mechanism further includes a first one-way valve arranged between the first pipeline and the three-way connector.

The water cooling mechanism further includes a second one-way valve arranged between the second pipeline and the three-way connector.

In one of the embodiments, a water shortage protector is provided between the three-way connector and the water inlet.

In one of the embodiments, a solenoid valve with two inlets and one outlet arranged at a junction of the water inlet, the first pipeline, and the second pipeline is further included.

In one of the embodiments, the air cooling module includes a fixing base and a plurality of fans arranged on the fixing base. The first pipeline is connected to the fixing base. A flow channel is provided in the fixing base. An air outlet of each of the fans is arranged toward the flow channel.

In one of the embodiments, a plurality of flow channels are provided.

In one of the embodiments, the water chiller is detachably arranged on the second pipeline.

In one of the embodiments, an inlet and an outlet of the water chiller are each provided with a joint. The joint is capable of being connected to the second pipeline.

In one of the embodiments, a power module is further included. The power module is electrically connected to the air cooling module, the water pump, the water chiller, and the solenoid valve with one inlet and two outlets.

ILLUSTRATION FOR REFERENCE NUMERALS

Figure 1:
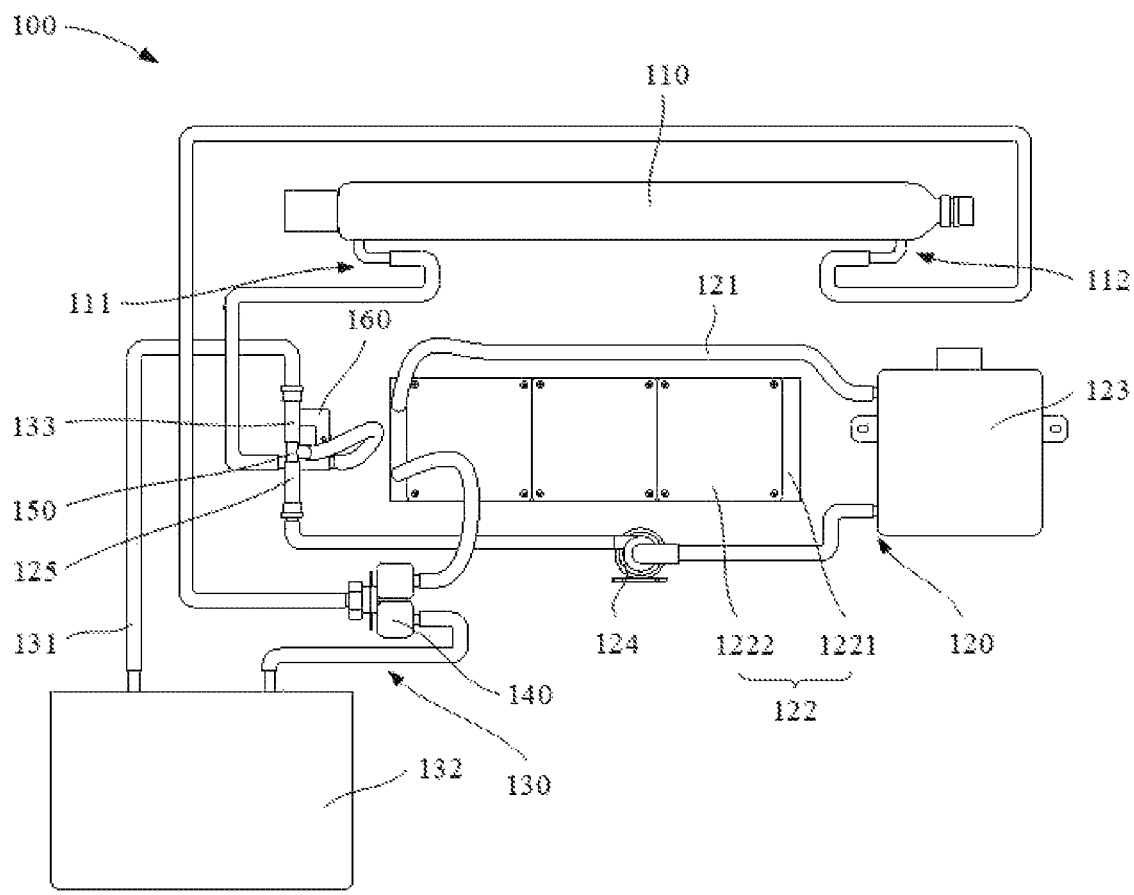
FIG. 1 is a structural schematic view of a cooling system for a laser according to the present disclosure.

100—cooling system for laser;
110—laser; 111—water inlet; 112—water outlet;
120—air cooling mechanism; 121—first pipeline; 122—air cooling module; 1221—fixing base; 1222—fan; 123—cooling liquid tank; 124—water pump; 125—first one-way valve;
130—water cooling mechanism; 131—second pipeline; 132—water chiller; 133—second one-way valve; 134—joint;
140—solenoid valve with one inlet and two outlets;
150—three-way connector;
160—water shortage protector;
170—solenoid valve with two inlets and one outlet.

DETAILED DESCRIPTION OF THE EMBODIMENTS

In order to enable the above objects, features and advantages of the present disclosure more obvious and understandable, the specific embodiments of the present disclosure will be described in detail below with reference to the accompanying drawings. In the following description, many specific details are illustrated in order to aid in understanding of the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that orientation or positional conditions indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional relationships shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless explicitly specified and defined otherwise, terms "mounting", "connecting", "connected", and "fixing" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction between two elements, unless explicitly defined otherwise. The specific meanings of the above terms in the present disclosure can be understood by one of those ordinary skills in the art according to specific circumstances.

In the present disclosure, unless expressly specified and defined otherwise, a first feature being "on" or "below" a second feature may mean that the first feature is in direct contact with the second feature, or may mean that the first feature is in indirect contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

It should be noted that when an element is referred to as being "fixed to" or "provided on" another element, it can be directly on another element or there may be an intermediate element therebetween. When an element is considered to be "connected to" another element, it can be directly connected to another element or there may be an intermediate element therebetween at the same time. The terms "vertical", "horizontal", "upper", "lower", "left", "right", and the like used herein are for illustrative purposes only and are not intended to be the only embodiments.

The technical solutions provided by embodiments of the present disclosure are described below with reference to the accompanying drawings.

Figure 2:
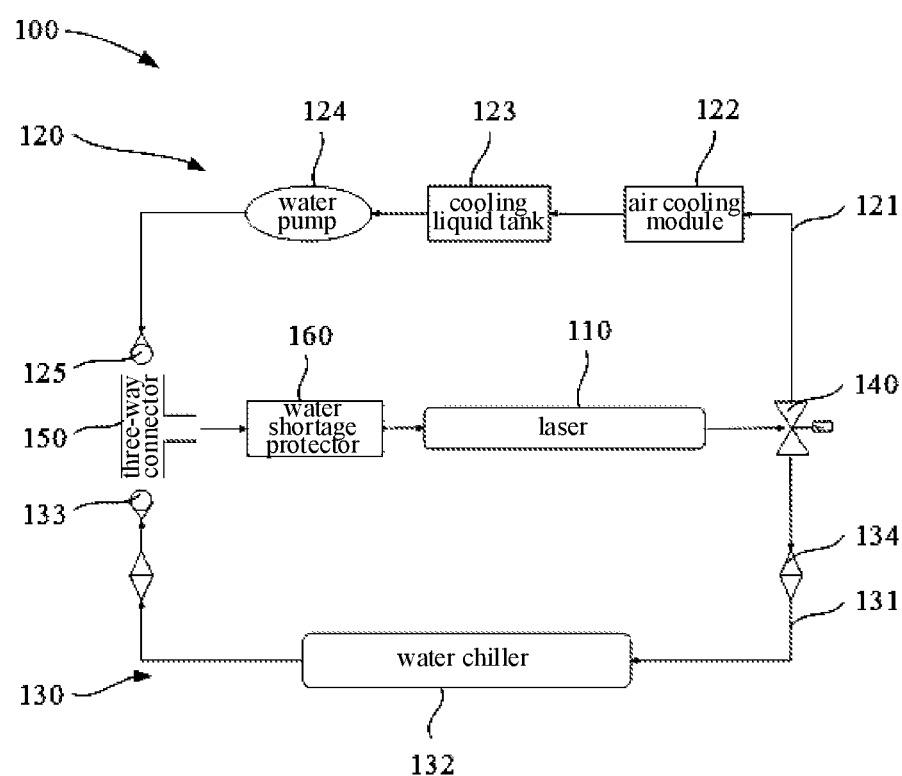
FIG. 2 is an operating schematic view of the cooling system for the laser according to the present disclosure.

As shown in FIGS. 1 and 2, the present disclosure provides a cooling system 100 for a laser. The cooling system 100 for the laser includes a laser 110, an air cooling mechanism 120, a water cooling mechanism 130, and a solenoid valve 140 with one inlet and two outlets. A housing of the laser 110 has a water inlet 111 and a water outlet 112. Cooling liquid can flow in the laser 110 through the water inlet 111 and the water outlet 112. The cooling liquid can be water medium, ethanol, or other liquid medium that can take away heat.

The air cooling mechanism 120 includes a first pipeline 121, an air cooling module 122, a cooling liquid tank 123, and a water pump 124. Both ends of the first pipeline 121 are connected to the water inlet 111 and the water outlet 112, respectively. That is, one end of the first pipeline 121 is connected to the water inlet 111, and the other end of the first pipeline 121 is connected to the water outlet 112, ensuring that the first pipeline 121 is in communication with the laser 110, so that the cooling liquid can flow between the first pipeline 121 and the laser 110. The air cooling module 122, the cooling liquid tank 123, and the water pump 124 are sequentially connected together through the first pipeline 121. Specifically, an inlet and an outlet of the air cooling module 122 are both connected to the first pipeline 121. When the cooling liquid that has absorbed the heat flows to the air cooling module 122 through the first pipeline 121, the air cooling module 122 can blow air to cool the cooling liquid that has absorbed the heat. The cooling liquid tank 123 is in communication with the water pump 124 through the first pipeline 121, and the water pump 124 is closer to the water inlet 111. An inlet and an outlet of the cooling liquid tank 123 are both connected to the first pipeline 121, so that the cooling liquid can flow back into the cooling liquid tank 123. The water pump 124 can pump the cooling liquid flowed back into the cooling liquid tank 123 to provide power for the circulating flow of the cooling liquid in the first pipeline 121.

The water cooling mechanism 130 includes a second pipeline 131 and a water chiller 132. Both ends of the second pipeline 131 are connected to the water inlet 111 and the water outlet 112, respectively. That is, one end of the second pipeline 131 is connected to the water inlet 111, and the other end of the second pipeline 131 is connected to the water outlet 112, ensuring that the second pipeline 131 is in communication with the laser 110, so that the cooling liquid can flow between the second pipeline 131 and the laser 110. The water chiller 132 is arranged on the second pipeline 131, and is in communication with the second pipeline 131. Specifically, an inlet and an outlet of the water chiller 132 are both connected to the second pipeline 131, so that the cooling liquid can flow back into the water chiller 132. The water chiller 132 cools the cooling liquid through a refrigeration system.

The solenoid valve 140 with one inlet and two outlets is arranged at a junction of the water outlet 112, the first pipeline 121, and the second pipeline 131. Through the solenoid valve 140 with one inlet and two outlets, the first pipeline 121 can be selected to be in communication with the laser 110, or the second pipeline 131 can be selected to be in communication with the laser 110. The specific operating process is as follows. When the laser 110 generates less heat during operation, the air cooling mechanism 120 is activated, and the solenoid valve 140 with one inlet and two outlets selectively provides a communication between the laser 110 and the first pipeline 121. In this case, a communicating channel between the laser 110 and the second pipeline 131 is closed. After absorbing the heat generated by the laser 110 during operation, the cooling liquid flows to the first pipeline 121 through the water outlet 112. When the cooling liquid flows through the air cooling module 122, the air blown by the air cooling module 122 takes away the heat absorbed by the cooling liquid in time, and then the cooling liquid flows back into the cooling liquid tank 123. The air-cooled cooling liquid stored in the cooling liquid tank 123 is pumped by the water pump 124, and then flows into the laser 110 through the water inlet 111 again, so that the cooling liquid can be circulated and reused, and the laser 110 can be cooled down under the premise of low energy consumption. When the laser 110 generates a lot of heat during operation, the water cooling mechanism 130 is activated, and the solenoid valve 140 with one inlet and two outlets selectively provides a communication between the laser 110 and the second pipeline 131. In this case, a communicating channel between the laser 110 and the first pipeline 121 is closed. After absorbing the heat generated by the laser 110 during operation, the cooling liquid flows to the second pipeline 131 through the water outlet 112, and is cooled down in the water chiller 132, and then, the water-cooled cooling liquid flows into the laser 110 through the water inlet 111 again, so that the cooling liquid can be circulated and reused, and the laser 110 can be cooled down under the premise of ensuring the reliability of cooling. The cooling system 100 for the laser according to the present disclosure can be flexibly switched to be connected to the air cooling mechanism 120 or the water cooling mechanism 130 based on the amount of heat generated by the laser 110 during operation, which can timely remove the heat generated by the laser 110 during operation, control the temperature of the laser 110 to be in an optimal range, ensuring the cooling reliability of the laser 110, and can reduce energy consumption.

Compared with a conventional cooling system for a laser, the single choice of using the air cooling method to remove heat is not applicable for medium and high power lasers and lasers operating in harsh environments such as high temperatures, or only using the water cooling method to remove heat results in high power consumption of low-power lasers. The cooling system 100 for the laser according to the present disclosure can be flexibly switched to be connected to the air cooling mechanism 120 or the water cooling mechanism 130 based on the amount of heat generated by the laser 110 during operation, which can timely remove the heat generated by the laser 110 during operation, control the temperature of the laser 110 to be in an optimal range, ensuring the cooling reliability of the laser 110, and can reduce energy consumption.

In order to provide communications between the laser 110 and the first pipeline 121 and between the laser 110 and the second pipeline 131, in an embodiment, as shown in FIGS. 1 and 2, the cooling system 100 for the laser further includes a three-way connector 150. The three-way connector 150 is arranged at the junction of the water inlet 111, the first pipeline 121, and the second pipeline 131, to provide communications between the laser 110, the first pipeline 121, and the second pipeline 131. When the laser 110 generates less heat during operation, the cooling liquid flows in the laser 110 and the first pipeline 121, and the flowing cooling liquid is blown and cooled down by the air cooling module 122, so that the heat absorbed by the cooling liquid can be taken away in time. Switching to an air cooling mode can reduce energy consumption. When the laser 110 generates a lot of heat during operation, the cooling liquid flows in the laser 110 and the second pipeline 131, and the cooling liquid flowing in the second pipeline 131 is cooled down by the water chiller 132, so that the heat absorbed by the cooling liquid can be taken away in time. Switching to a water cooling mode can ensure the cooling reliability of the laser 110.

It should be noted that, in this embodiment, the three-way connector 150 is a common three-way tube on the market, which can provide communications between the laser 110, the first pipeline 121, and the second pipeline 131. The specific structure of the three-way connector 150 will not be repeatedly described in the present disclosure.

In order to ensure that the first pipeline 121 and the second pipeline 131 are independent of each other, specifically, as shown in FIGS. 1 and 2, the air cooling mechanism 120 further includes a first one-way valve 125. The first one-way valve 125 is arranged between the first pipeline 121 and the three-way connector 150. The first one-way valve 125 can only allow the cooling liquid to enter the laser 110 through the water inlet 111 from the first pipeline 121, so as to ensure the cooling liquid in the first pipeline 121 does not flow to the second pipeline 131, or a backflow phenomenon does not occur, so as to cool the laser 110. Likewise, the water cooling mechanism 130 further includes a second one-way valve 133. The second one-way valve 133 is arranged between the second pipeline 131 and the three-way connector 150. The second one-way valve 133 can only allow the cooling liquid to enter the laser 110 through the water inlet 111 from the second pipeline 131, so as to ensure the cooling liquid in the second pipeline 131 does not flow to the first pipeline 121, or a backflow phenomenon does not occurs, so as to cool the laser 110.

In the above-mentioned cooling system 100 for the laser, the arrangement of the first one-way valve 125 and the second one-way valve 133 can ensure that the first pipeline 121 and the second pipeline 131 are independent of each other. When the first pipeline 121 is in communication with the laser 110, the cooling liquid flowing in the first pipeline 121 can all enter the laser 110. In addition, when the second pipeline 131 is in communication with the laser 110, the cooling liquid flowing in the second pipeline 131 can all enter the laser 110, thereby improving the cooling effect on the laser 110.

In order to further ensure the cooling effect on the laser 110, specifically, as shown in FIGS. 1 and 2, a water shortage protector 160 is arranged between the three-way connector 150 and the water inlet 111. During the operating process of the laser 110, the water shortage protector 160 can sense whether there is cooling liquid flowing in the laser 110 at any time. When the water shortage protector 160 senses that there is no cooling liquid flowing in the laser 110, or the cooling liquid flowing in the laser 110 is less, the water shortage protector 160 sends a sensing signal to a control terminal in time. The control terminal can suspend the operation of the laser 110 to ensure that the cooling effect on the laser 110, which can prevent affecting the outputted light performance and service life of the laser 110 due to the serious heat generation during the operating process of the laser 110.

In order to improve the cooling efficiency of the cooling liquid in the cooling liquid tank 123, in an embodiment, as shown in FIGS. 1 and 2, the air cooling module 122 includes a fixing base 1221 and a plurality of fans 1222. The plurality of fans 1222 are all arranged on the fixing base 1221 by screwing, welding, etc. The first pipeline 121 is connected to the fixing base 1221. A flow channel (not shown in figures) is provided in the fixing base 1221 for the cooling liquid to flow in the air cooling module 122. In other words, both an inlet and an outlet of the flow channel of the fixing base 1221 are connected to the first pipeline 121, so that the cooling liquid in the first pipeline 121 can flow into the flow channel of the fixing base 1221. Since air outlets of the plurality of fans 1222 are all arranged toward the flow channel, when the cooling liquid flows into the flow channel of the fixing base 1221, the plurality of fans 1222 can blow air towards the flow channel, so that the cooling liquid flowing in the fixing base 1221 can be rapidly cooled, thereby improving the cooling efficiency and cooling effect of the cooling liquid.

In order to further improve the cooling effect on the laser 110, specifically, as shown in FIGS. 1 and 2, a plurality of flow channels are provided. By arranging the plurality of flow channels, the heat dissipation area of the air cooling module 122 can be increased, so as to increase the heat dissipation efficiency of the cooling liquid flowing in the flow channels, and further improve the cooling effect on the laser 110.

In order to improve the applicability of the cooling system 100 for the laser, in an embodiment, as shown in FIGS. 1 and 2, the water chiller 132 is detachably connected to the second pipeline 131. When the laser 110 generates less heat during operation, the water chiller 132 can be detached from the second pipeline 131 due to the large volume of the water chiller 132 to reduce the volume of the cooling system 100 for the laser. As such, the moving convenience of the cooling system 100 for the laser can be increased, and the applicability of the cooling system 100 for the laser can be improved.

Specifically, both the inlet and the outlet of the water chiller 132 are provided with a joint 134. The water chiller 132 is connected to the second pipeline 131 through the joint 134. When the laser 110 generates less heat during operation, the joint 134 can be detached from the second pipeline 131 to complete the separation of the water chiller 132 and the laser 110, thereby increasing the moving convenience of the cooling system 100 for the laser. When the laser 110 generates a lot of heat during operation, the joint 134 is connected to the second pipeline 131 to complete a combined connection of the water chiller 132 and the laser 110, thereby ensuring the cooling reliability of the cooling system 100 for the laser.

In order to drive the cooling system 100 for the laser to operate, in an embodiment, as shown in FIG. 1, the cooling system 100 for the laser further includes a power module (not shown in figures). The power module is electrically connected to the air cooling module 122 through wires to drive the air cooling module 122 to operate. The air generated by the air cooling module 122 takes away the heat absorbed by the cooling liquid in time. The power module is electrically connected to the water pump 124 through wires to drive the water pump 124 to pump the cooling liquid in the cooling liquid tank 123, so as to realize the circulating flow of the cooling liquid in the first pipeline 121 and the laser 110. The power module is electrically connected to the water chiller 132, to drive the water chiller 132 to cool down the cooling liquid flowing in the second pipeline 131. The power module is electrically connected to the solenoid valve 140 with one inlet and two outlets through wires, so as to selectively provide a communication between the laser 110 and the first pipeline 121, or provide a communication between the laser 110 and the second pipeline 131, based on the amount of heat generated by the laser 110 during operation, so that the air cooling mechanism 120 and the water cooling mechanism 130 can be connected flexibly.

Figure 3:
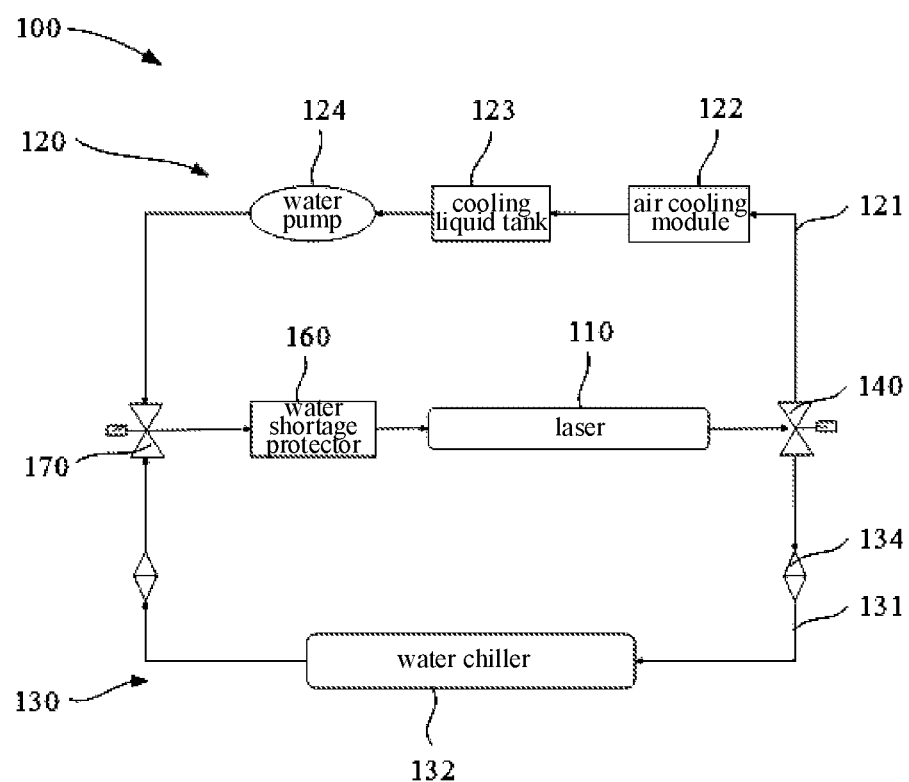
FIG. 3 is an operating schematic view of a cooling system for a laser according to another embodiment of the present disclosure.

In addition, as shown in FIGS. 1 and 3, in another embodiment, the cooling system 100 for the laser further includes a solenoid valve 170 with two inlets and one outlet. The solenoid valve 170 with two inlets and one outlet is arranged at the junction of the water inlet 111, the first pipeline 121, and the second pipeline 131. In other words, the solenoid valve 170 with two inlets and one outlet can be used to replace the first one-way valve 125, the second one-way valve 133, and the three-way connector 150 in the above embodiments. When the solenoid valve 170 with two inlets and one outlet is in communication with the laser 110, the first pipeline 121, and the second pipeline 131, the first pipeline 121 and the second pipeline 131 can be ensured to be independent of each other.

The operating process of the cooling system 100 for the laser is as follows. When the laser 110 generates less heat during operation, the air cooling mechanism 120 is activated, and both the solenoid valve 140 with one inlet and two outlets and the solenoid valve 170 with two inlets and one outlet selectively provide a communication between the laser 110 and the first pipeline 121. In this case, the communicating channel between the laser 110 and the second pipeline 131 is closed. After absorbing the heat generated by the laser 110 during operation, the cooling liquid flows to the first pipeline 121 through the water outlet 112. When the cooling liquid flows through the air cooling module 122, the air blown by the air cooling module 122 takes away the heat absorbed by the cooling liquid in time, and then the cooling liquid flows back into the cooling liquid tank 123. The air-cooled cooling liquid stored in the cooling liquid tank 123 is pumped by the water pump 124, and then flows into the laser 110 through the water inlet 111 again, so that the cooling liquid can be circulated and reused, and the laser 110 can be cooled down under the premise of low energy consumption. When the laser 110 generates a lot of heat during operation, the water cooling mechanism 130 is activated, and both the solenoid valve 140 with one inlet and two outlets and the solenoid valve 170 with two inlets and one outlet selectively provide a communication between the laser 110 and the second pipeline 131. In this case, the communicating channel between the laser 110 and the first pipeline 121 is closed. After absorbing the heat generated by the laser 110 during operation, the cooling liquid flows to the second pipeline 131 through the water outlet 112, and is cooled down in the water chiller 132, and then, the water-cooled cooling liquid flows into the laser 110 through the water inlet 111 again, so that the cooling liquid can be circulated and reused, and the laser 110 can be cooled down under the premise of ensuring the reliability of cooling.

The technical features of the above described embodiments can be combined arbitrarily. To simplify the description, not all possible combinations of the technical features in the above embodiments are described. However, all of the combinations of these technical features should be considered as being fallen within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. The protection scope of the present disclosure shall be subject to the appended claims.

What is claimed is:

1. A cooling system for a laser, comprising:
   a laser, provided with a housing having a water inlet and a water outlet;
   an air cooling mechanism comprising a first pipeline, an air cooling module, a cooling liquid tank, and a water pump; the air cooling module, the cooling liquid tank, and the water pump being sequentially connected through the first pipeline; both ends of the first pipeline being connected to the water inlet and the water outlet, respectively; the water pump being closer to the water inlet;
   a water cooling mechanism comprising a second pipeline and a water chiller in communication with the second pipeline; both ends of the second pipeline being connected to the water inlet and the water outlet, respectively; and
   a solenoid valve with one inlet and two outlets arranged at a junction of the water outlet, the first pipeline, and the second pipeline.

2. The cooling system for the laser according to claim 1, further comprising a three-way connector; wherein the three-way connector is arranged at a junction of the water inlet, the first pipeline, and the second pipeline.

3. The cooling system for the laser according to claim 2, wherein the air cooling mechanism further comprises a first one-way valve arranged between the first pipeline and the three-way connector; and
   the water cooling mechanism further comprises a second one-way valve arranged between the second pipeline and the three-way connector.

4. The cooling system for the laser according to claim 2, wherein a water shortage protector is provided between the three-way connector and the water inlet.

5. The cooling system for the laser according to claim 1, further comprising a solenoid valve with two inlets and one outlet arranged at a junction of the water inlet, the first pipeline, and the second pipeline.

6. The cooling system for the laser according to claim 1, wherein the air cooling module comprises a fixing base and a plurality of fans arranged on the fixing base; the first pipeline is connected to the fixing base; a flow channel is provided in the fixing base; and an air outlet of each of the fans is arranged toward the flow channel.

7. The cooling system for the laser according to claim 6, wherein a plurality of flow channels are provided.

8. The cooling system for the laser according to claim 1, wherein the water chiller is detachably arranged on the second pipeline.

9. The cooling system for the laser according to claim 8, wherein an inlet and an outlet of the water chiller are each provided with a joint; and the joint is capable of being connected to the second pipeline.

10. The cooling system for the laser according to claim 1, further comprising a power module; wherein the power module is electrically connected to the air cooling module, the water pump, the water chiller, and the solenoid valve with one inlet and two outlets.

\* \* \* \* \*